United States Patent
Henderson

(10) Patent No.: US 10,358,303 B2
(45) Date of Patent: Jul. 23, 2019

(54) TELESCOPIC BOOM CONVEYOR WITH OPERATOR PLATFORM

(71) Applicant: SOVEX LIMITED, Prenton (GB)

(72) Inventor: Martin Neil Henderson, Wallasey (GB)

(73) Assignee: Sovex Limited (GB)

( * ) Notice: Subject to any disclaimer, the term of this patent is extended or adjusted under 35 U.S.C. 154(b) by 0 days.

(21) Appl. No.: 15/566,916

(22) PCT Filed: Apr. 15, 2016

(86) PCT No.: PCT/GB2016/051062
§ 371 (c)(1),
(2) Date: Oct. 16, 2017

(87) PCT Pub. No.: WO2016/170308
PCT Pub. Date: Oct. 27, 2016

(65) Prior Publication Data
US 2018/0093838 A1  Apr. 5, 2018

(30) Foreign Application Priority Data
Apr. 23, 2015  (GB) .................................. 1506950.3

(51) Int. Cl.
B65G 67/02 (2006.01)
B65G 67/08 (2006.01)
B66F 11/04 (2006.01)

(52) U.S. Cl.
CPC ............ B65G 67/02 (2013.01); B65G 67/08 (2013.01); B66F 11/046 (2013.01); *B65G 2207/40* (2013.01)

(58) Field of Classification Search
CPC .... B65G 41/002; B65G 41/005; B65G 67/02; B65G 67/08; B66F 11/46
(Continued)

(56) References Cited

U.S. PATENT DOCUMENTS 2,928,493 A    3/1960  Clements
3,108,656 A *  10/1963  Asplundh ............. B66F 11/044
                                          182/2.4
(Continued)

FOREIGN PATENT DOCUMENTS

DE    10 2008 036721    2/2010
EP    0 581 383         2/1994
(Continued)

OTHER PUBLICATIONS

International Preliminary Report on Patentability dated Oct. 24, 2017 for International application No. PCT/GB2016/051062.
(Continued)

*Primary Examiner* — William R Harp
(74) *Attorney, Agent, or Firm* — Fay Sharpe LLP

(57) ABSTRACT

A boom conveyor includes a boom that carries a conveyor, a support structure, a rear pivot joint that connects a rear end of the boom to the support structure, and a pivot drive that controls pivoting movement of the boom. An operator cage is attached by a front pivot joint to a front end of the boom. A levelling system controls rotation of the operator cage about the front pivot joint. The levelling system includes a flexible cord attached to the operator cage and extending towards the rear end of the boom, and a level adjusting device that is attached to the support structure adjacent the rear end of the boom and engages an adjusting portion of the cord. During pivoting movement of the boom, the level adjusting device controls longitudinal movement of the cord relative to the boom so as to apply a levelling adjustment to the operator cage.

20 Claims, 3 Drawing Sheets

(58) Field of Classification Search
USPC ....... 198/861.5, 812, 593, 594; 182/2.1, 2.2, 182/2.3, 2.4, 2.5, 2.6, 2.7, 2.8, 2.9, 2.11
See application file for complete search history.

(56) References Cited

U.S. PATENT DOCUMENTS

| | | | | | |
|---|---|---|---|---|---|
| 3,301,346 | A | * | 1/1967 | Verrell | B66F 11/046 182/2.3 |
| 3,415,924 | A | * | 12/1968 | Girardi | B29D 29/06 264/229 |
| 3,667,190 | A | * | 6/1972 | Thornton-Trump | A01D 46/20 198/560 |
| 4,429,763 | A | * | 2/1984 | Houck | B66F 11/044 182/2.9 |
| 4,858,723 | A | * | 8/1989 | Holmes | B66F 11/044 182/2.9 |
| 4,946,027 | A | * | 8/1990 | Jenkins | B65G 21/12 182/2.11 |
| 5,016,731 | A | * | 5/1991 | Holmes | B66F 11/044 182/2.8 |
| 5,351,809 | A | | 10/1994 | Gilmore et al. | |
| 5,727,645 | A | | 3/1998 | Woodling | |

FOREIGN PATENT DOCUMENTS

| | | |
|---|---|---|
| FR | 2 403 968 | 4/1979 |
| GB | 1 600 387 | 10/1981 |
| GB | 2 116 236 | 9/1983 |
| GB | 2 484 546 | 4/2012 |
| JP | S50-5356 | 1/1975 |
| JP | S50-21761 | 7/1975 |
| JP | S50-27121 | 8/1975 |
| JP | H02-270799 | 11/1990 |
| WO | WO 2014/127507 | 8/2014 |

OTHER PUBLICATIONS

International Search Report dated Jun. 27, 2016 for International application No. PCT/GB2016/051062.
Written Opinion dated Jun. 27, 2016 for International application No. PCT/GB2016/051062.
British Search Report dated Oct. 12, 2015 for Application No. GB1506950.3.

* cited by examiner

TELESCOPIC BOOM CONVEYOR WITH OPERATOR PLATFORM

FIELD OF INVENTION

The present invention relates to a telescopic boom conveyor for loading and unloading pallets and containers. In particular but not exclusively it relates to a telescopic boom conveyor for use with unit load devices (ULDs), also known as "air cans", which are used for transporting goods by air. These may be up to 3 meters tall and can contain a variety of goods.

BACKGROUND

Upon arrival at a distribution centre, the goods are unloaded via the boom from the ULDs and sorted for delivery to customers/retailers. The ULDs are then reloaded via the boom with other goods for transportation.

The goods are generally loaded and unloaded using a pivoting telescopic boom conveyor that can be extended telescopically and raised/lowered as required. Goods from the ULD are transferred by hand onto the boom conveyor, which then conveys the goods into the distribution centre via either a travelling conveyor belt or a set of rotating rollers.

In order to transfer goods to and from the boom conveyor, it may be necessary for the operator to stand on a step ladder or platform. However, this is not an ideal solution as it may not be possible for the operator to adjust the height of the stepladder or platform as the height of the boom changes. Also, the use of a stepladder may give rise to safety risks.

It is known to attach an operator platform rigidly to the end of a boom conveyor, allowing an operator to stand at the correct height. This solution is satisfactory when the boom pivots through only a small angle, for example less than 5°. However, if the boom pivots through a larger angle, the floor of the platform may tilt excessively making the operator platform unstable and dangerous to use. This problem is most likely to occur if the boom is relatively short, for example less than 10 meters in length when fully extended.

In the field of mobile access platforms it is known to provide a self-levelling operator platform on an extending boom. Such an apparatus is described for example in EP0581383A. However, the self-levelling mechanism is complex and unsuitable for a boom conveyor that carries a conveyor belt or rollers. Devising a self-levelling mechanism that is simple and reliable, and that is suitable for use on a pivoting boom conveyor is difficult.

SUMMARY OF THE INVENTION

It is an object of the present invention to provide a boom conveyor apparatus that mitigates one or more problems associated with known boom conveyors, or that provides a useful alternative thereto.

According to an embodiment of the invention there is provided a boom conveyor apparatus including a boom that carries a conveyor, a support structure for the boom, a rear pivot joint that connects a rear end of the boom to the support structure, a pivot drive that controls pivoting movement of the boom about the rear pivot joint, an operator cage attached by a front pivot joint to a front end of the boom, and a levelling system that controls rotation of the operator cage about the front pivot joint, wherein the levelling system includes a flexible cord that is attached to the operator cage and extends from the cage towards the rear end of the boom, and a level adjusting device that is attached to the support structure adjacent the rear end of the boom and engages an adjusting portion of the cord, whereby during pivoting movement of the boom the level adjusting device controls longitudinal movement of the cord relative to the boom so as to apply a levelling adjustment to the operator cage.

Therefore, in an embodiment, the invention includes a levelling system comprising a flexible cord, for example a steel cable, which controls pivoting movement of the operator cage about the front pivot point. The cord is engaged by a level adjusting device adjacent the rear end of the boom, which adjusts the rotational position of the operator cage relative to the front pivot joint as the boom pivots about the rear pivot point, to ensure that the operator cage is maintained in a level condition with the base of the cage substantially horizontal (for example, within 5° of the horizontal). The levelling system provides direct mechanical control of the operator cage position, as longitudinal movement of the cord relative to the boom is related directly to pivoting movement of the boom.

The mechanism is very simple and reliable and does not interfere with operation of the boom. It allows an operator to stand at the correct height relative to the front end of the boom for safe and efficient loading and unloading operations, and avoids the risks associated with the use of step ladders and separate platform.

The levelling system may optionally include a lower guide element attached to the boom adjacent the rear end thereof, wherein the adjusting portion of the cord extends between the lower guide element and the level adjusting device, the level adjusting device and the lower guide element both being located below the rear pivot joint. This provides a convenient configuration of the levelling system, which does not interfere with the movement of goods along the conveyor. However, other configurations are also possible: for example, the level adjusting device could alternatively be located above the rear pivot joint.

The levelling system may optionally include an upper guide element or anchor attached to the boom adjacent the rear end thereof, wherein the adjusting portion of the cord extends between the lower guide element and the upper guide element or the anchor, and the level adjusting device engages the adjusting portion of the cord between the lower guide element and the upper guide element or the anchor. Alternatively, the cord adjusting device may be attached to a rear end of the cord.

Optionally, the lower guide element and/or the upper guide element comprises a pulley wheel.

The levelling system is optionally configured such that the cord is maintained in tension by the weight of the operator cage. This is a very simple and reliable solution, which avoids the need for additional structures. Alternatively however a resilient biasing element or a mechanical drive or other structure may be used to maintain the cord in tension.

Optionally, the cord is attached to the operator cage above the front pivot joint.

The boom conveyor may include a rear boom section that is connected by the rear pivot joint to the support structure, and a front boom section that is connected by the front pivot joint to the operator cage, wherein the front and rear boom sections are telescopically adjustable to adjust the length of the boom conveyor.

The levelling system may optionally include a compensating mechanism that compensates for changes in the length of the boom conveyor.

Optionally, the compensating mechanism includes a first compensating guide element located towards a rear end of the front boom section and a second compensating guide element located towards a front end of the rear boom section, wherein the cord includes a front portion that extends from the operator cage to the first compensating guide element, an intermediate portion that extends from the first compensating guide element to the second compensating guide element, a rear portion that extends from the second compensating guide element to a return mechanism located towards the rear end of the boom conveyor, and a return portion that extends forwards from the return mechanism and is attached to the front boom section. This compensating mechanism ensures that the operator cage is maintained in a level configuration and is unaffected by changes in the length of the boom conveyor.

Optionally, the boom conveyor is pivotable through an angle of at least 10°, preferably at least 15°, more preferably at least 20°. The invention is particularly well suited to shorter booms, for example a length in the range 3 to 10 meters, which require a relatively large range of pivoting movement in order to provide an adequate range of operating heights.

The conveyor optionally comprises a conveyor belt that runs over an upper surface of the boom, or a plurality of conveyor rollers on an upper surface of the boom.

BRIEF DESCRIPTION OF THE DRAWINGS

An embodiment of the invention will now be described by a way of example with reference to the accompanying drawings, in which.

DETAILED DESCRIPTION OF THE INVENTION

Figure 1:
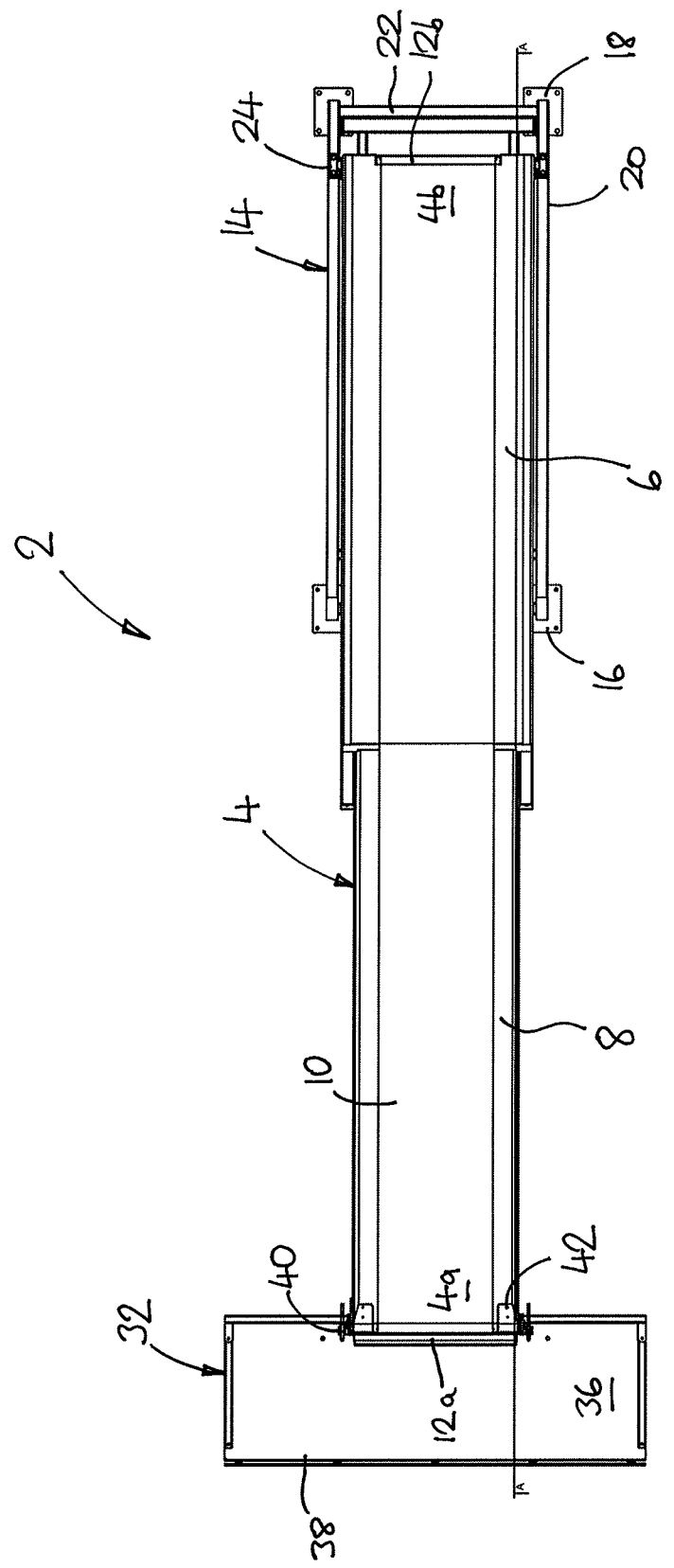
FIG. 1 is a plan view of a boom conveyor in an extended configuration.
Figure 2:
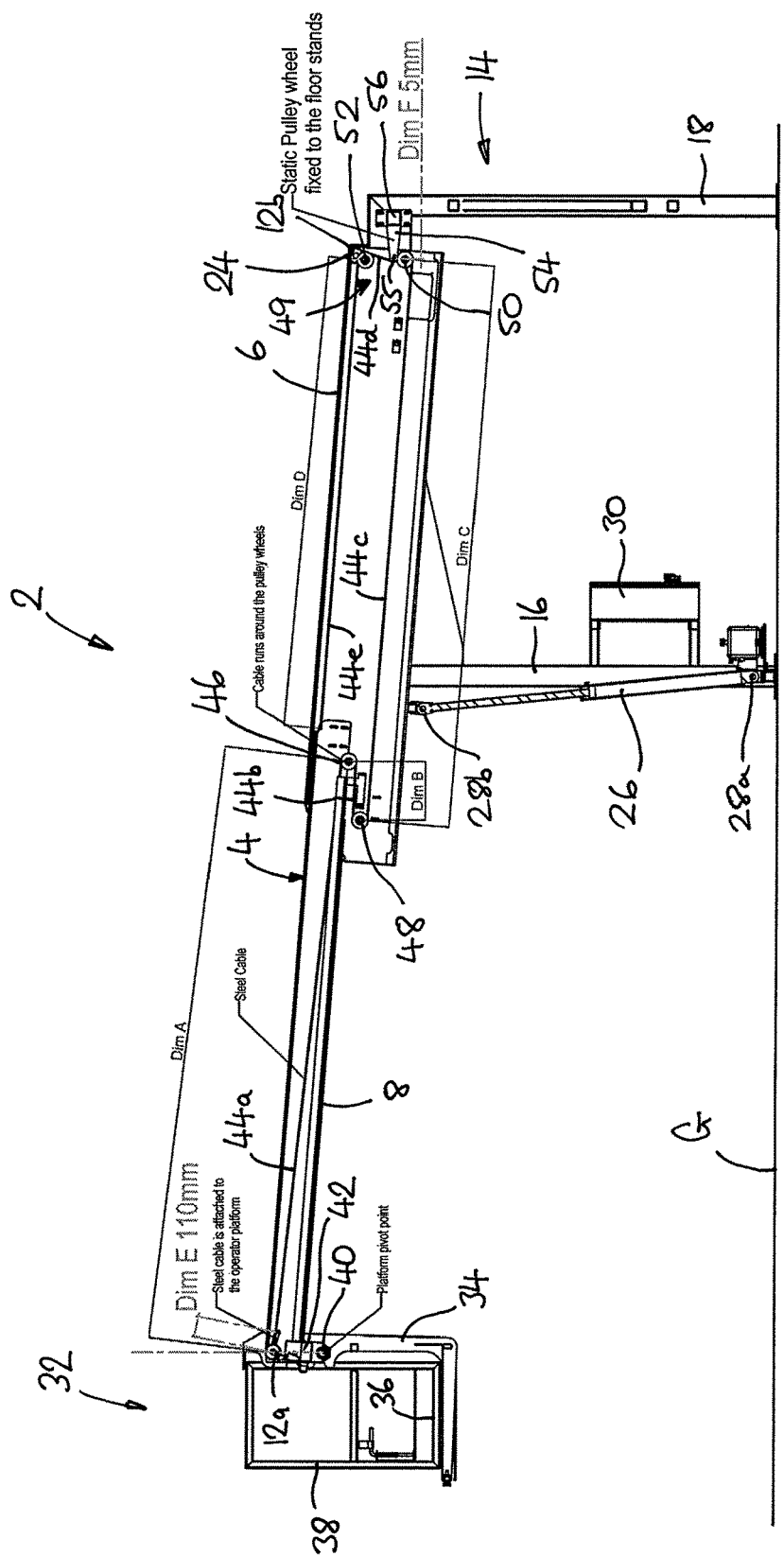
FIG. 2 is a side section on line A-A of FIG. 1 showing the boom conveyor in an extended and raised configuration.
Figure 3:
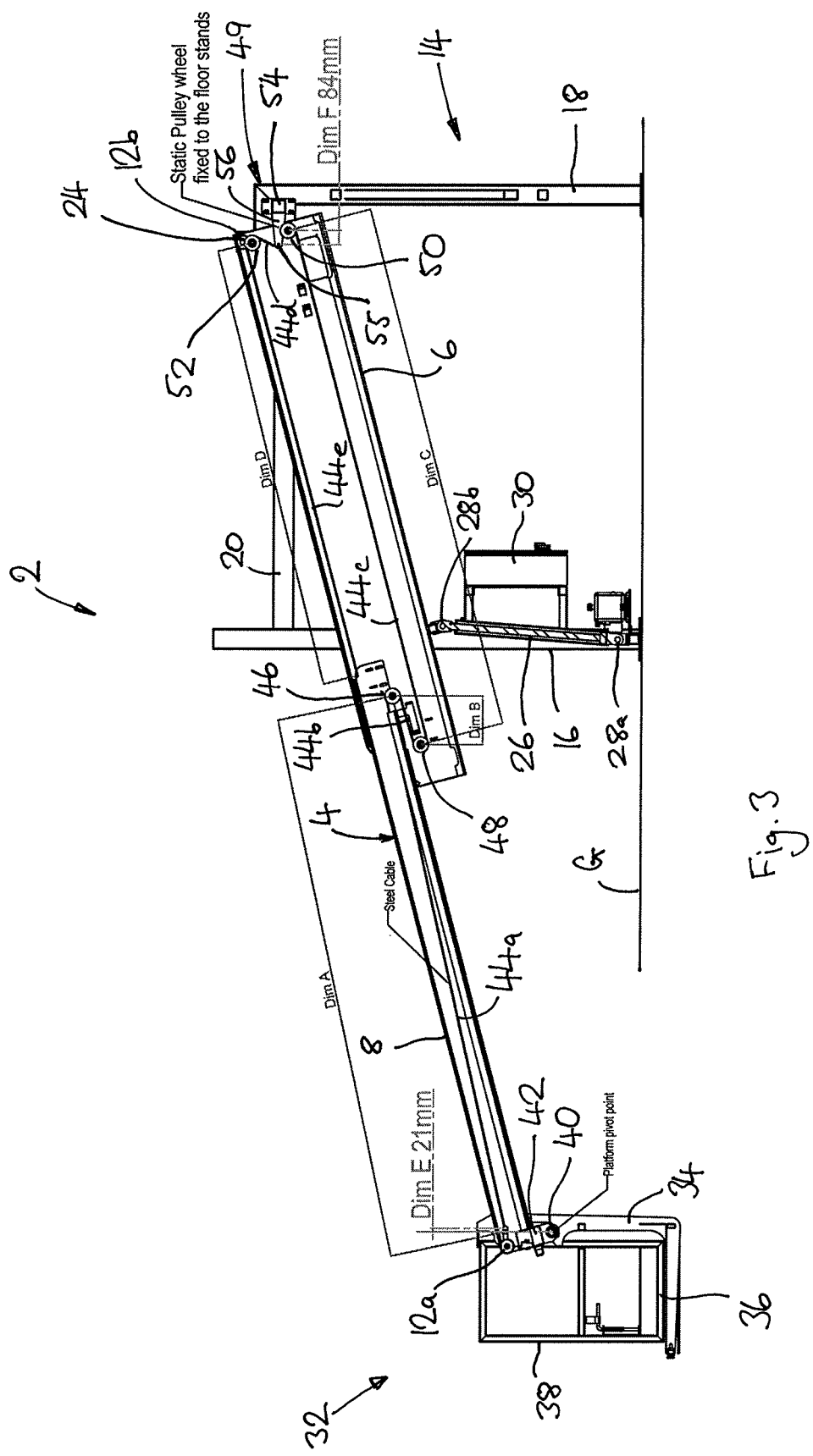
FIG. 3 is a side section on line A-A of FIG. 1 showing the boom conveyor in an extended and lowered configuration.

The loading apparatus 2 shown in FIGS. 1 to 3 includes a boom conveyor 4, which in this embodiment comprises a telescopic boom having a rear boom section 6 and a front boom section 8 that is telescopically extendable relative to the rear section 6 so as to adjust the overall length of the boom conveyor 4. Typically the boom conveyor 4 has a maximum length when fully extended of about 5.5 meters and a minimum length when fully contracted of about 3 meters. However, these dimensions are not intended to be limiting; in certain applications the boom conveyor may have a length when fully extended of 15 meters or more.

The boom conveyor 4 carries a conveyor, which in this embodiment comprises a conveyor 10 belt that passes around rollers 12a, 12b at the front and rear ends 4a, 4b of the boom. The conveyor belt 10 includes a conveying portion that runs along the upper surface of the boom 4 and a return portion (not shown) that extends through the interior of the boom 4. In the case of a telescopic boom, the return portion (not shown) will also pass around a tensioning mechanism (not shown) that takes up any slack in the belt as the telescopic boom contracts and extends and maintains a constant tension in the belt 10.

Alternatively, instead of having a conveyor belt 10, the boom conveyor 4 may be equipped with a plurality of conveyor rollers that can be either freely rotating or driven to convey goods along the boom conveyor for loading and unloading operations.

The boom conveyor 4 may also include drive mechanisms for adjusting the length of the boom and for driving the conveyor 10 forwards or backwards to convey goods along the boom during loading and unloading operations. The aforesaid tensioning mechanism and the drive mechanisms, as well as the support structure for supporting the telescopically extending front boom section 8 relative to the rear boom section 6 are all conventional and so will not be described in detail. They may however be similar to the structures and mechanisms described in GB2484546A or U.S. Pat. No. 5,351,809, for example. Also, the optional provision of conveyor rollers is conventional and so will not be described in detail.

The boom conveyor 4 is supported by a support structure 14, which in this embodiment comprises a pair of forward support legs 16, a pair of rear support legs 18 and a set of horizontal beams 20, 22 that interconnect the upper ends of the legs 16, 18. The boom conveyor 4 is pivotably attached to the support structure 14 by a rear pivot joint 24, which is located at the rear end 4b of the boom 4, close to the upper surface of the boom 4.

The boom conveyor 4 is supported for pivoting movement about the rear pivot joint 24 by a pivot drive, which in this embodiment comprises a hydraulic ram 26 that is attached at its lower end to a lower pivot joint 28a positioned between the feet of the forward support legs 16, and at its upper end to an upper pivot joint 28b located on the underside of the boom 4, towards the front end of the rear section 6. The hydraulic ram 26 controls pivoting movement of the boom 4 about the rear pivot joint 24 to adjust the height of the front end 4a of the boom above the ground G. Other types of pivot drive for controlling pivoting movement of the boom 4 can also be used of course.

The hydraulic ram 26 can be extended or contracted to raise or lower the front end 4a of the boom 4. For example, in FIG. 2 the boom is shown in a fully raised position in which the front end of the boom is lifted to a height of about 2.3 meters above the ground G, and in FIG. 3 it is shown in a fully lowered position, in which the front end of the boom 4 is about 0.5 meters above the ground G. In this embodiment the boom conveyor 4 pivots through an angle of about 20° between the fully raised and fully lowered positions. These dimensions are not intended to be limiting: in other embodiments the boom conveyor 4 may be arranged to pivot through a greater or lesser range of angles.

The operational functions of the boom conveyor 4, including raising and lowering of the boom, telescopic extension and contraction of the boom, and driving of the conveyor 10 may be controlled from a control unit 30.

An operator cage 32 for a human operator is attached to the front end 4a of the boom conveyor 4. The operator cage 32 includes an L-shaped support frame 34, a base 36 and a fence 38 that extends around the periphery of the base 36. Optionally, the operator cage 32 may include a control console (not shown) for controlling the operational functions of the boom conveyor 4.

The operator cage 32 is attached to the forward end 4a of the boom conveyor 4 by a front pivot joint 40, which connects the upright part of the L-shaped support frame 34 to a front bracket 42 that is attached to the front end of the boom 4. The operator platform 32 is able to rotate about the horizontal pivot axis of the front pivot joint 40.

The boom conveyor 4 includes a levelling system for maintaining the base 36 of the operator cage 32 in a horizontal position as the boom conveyor 4 is pivoted up and down. The levelling system includes at least one flexible cord 44, for example a steel cable, which is attached at one end to the upper end of the support frame 34. The cord 44 is maintained in tension by the weight of the operator cage 32 and the tendency of the cage to rotate under gravity in the direction of arrow A about the axis of the pivot joint 40. In one embodiment of the invention, a pair of identical cords are provided, which are located adjacent the opposite sides of the boom conveyor 4.

The cord 44 includes a front portion 44a that extends rearwards from the operator cage 32 through the interior of the front section 8 of the boom 4 and passes around a first compensating guide element 46 comprising a pulley wheel that is attached to the front section 8 of the boom towards the rear end thereof. An intermediate portion 44b of the cord extends forwards from the first compensating guide element 46 and passes around a second compensating guide element 48 comprising a pulley wheel that is attached to the rear section 6 of the boom conveyor, towards the front end thereof. A rear portion 44c of the cord extends rearwards from the second compensating guide element 48 and passes around a return mechanism 49 comprising a lower return pulley 50 and an upper pulley 52, which are attached to the rear boom section 6 and located towards the rear end of the boom conveyor 4.

The cord 44 includes an adjusting portion 44d that extends between the lower return pulley 50 and the upper return pulley 52. This adjusting portion 44d of the cord passes around and engages a level adjusting device 54 comprising a static pulley wheel 55 mounted on a bracket 56, which is fixed to the support structure 14. A return portion 44e of the cord extends forwards from the upper return pulley 52 and is attached to the rear end of the front boom section 8.

The levelling system described above is configured to ensure that the base 36 of the operator platform 32 is maintained in a horizontal position, regardless of the extension or inclination of the boom conveyor 4.

When the boom conveyor 4 tilts up or down, the horizontal position of the base 36 is maintained by the level adjusting device 54 that is attached to the support structure 14. As the boom conveyor 4 tilts downwards, for example to the position shown in FIG. 3, the upper and lower return pulleys 50, 52 move rearwards relative to the support structure 14, as they are located below the rear pivot joint 24. The level adjusting device 54 engages the adjusting portion 44d of the cord that extends between the upper and lower return pulleys 50, 52 and therefore as the pulleys 50, 52 move rearwards the overall length of the adjusting portion 4d of the cord increases. This causes rearward longitudinal movement of the cord 44 relative to the boom 4 and draws the operator platform 32 upwards, in the opposite direction to arrow A, thereby maintaining the base 36 of the platform in a horizontal position.

When the boom conveyor 4 tilts upwards, for example to the position shown in FIG. 2, the upper and lower return pulleys 50, 52 move forward relative to the level adjusting device 54, which decreases the length of the adjusting portion 4d of the cord. This allows the operator platform 32 to rotate in the direction of arrow A, contrary to the upwards rotation of the boom conveyor 4, thereby maintaining the base 36 of the platform in a horizontal position.

During telescopic extension/contraction of the boom 4 the first and second compensating pulley wheels 46, 48 take up or let out the appropriate length of cord from the intermediate portion 44b to maintain the platform in a horizontal position. For example, during contraction of the boom conveyor 4, as the front section 8 of the boom contracts telescopically into the rear section 6, the first compensating pulley wheel 46 moves rearwards away from the second compensating pulley wheel 48, thus increasing the length of the intermediate portion 44b of the cord between first and second compensating pulley wheels 46, 48. This compensates for the decreasing length of the return portion 44e, thereby maintaining the horizontal position of the base. Conversely, during extension of the boom conveyor 4, as the front section 8 of the boom extends telescopically from the rear section 6, the first compensating pulley wheel 46 moves forwards toward the second compensating pulley wheel 48, thus decreasing the length of the intermediate portion 44b of the cord between the first and second compensating pulley wheels. This again compensates for the increase in length of the return portion 44e, thus maintaining the horizontal position of the base 36.

The dimensions and relative positions of the components of the levelling system are selected carefully to ensure that the horizontal position of the operator platform base 36 is maintained. For example, in an embodiment, during telescopic extension of the boom the dimension A between the front end 4a of the boom and the first compensating pulley 46 is constant, for example 3000 millimeters. Dimension B between the first compensating pulley 46 and the second compensating pulley 48 is variable and alters as the front section 8 of the boom extends. For example, dimension B may have a value of 500 millimeters when the boom is fully extended and a value of 3000 millimeters when the boom is fully contracted. Dimension C between the second compensating pulley 48 and the lower return pulley 50 is constant, for example 3000 millimeters. Dimension D between the upper return pulley 52 and the rear end of the front section 8 of the boom is variable and alters as the front section extends. For example, dimension D may have a value of 3000 millimeters when the boom conveyor is fully extended and a value of 500 millimeters when the boom is fully contracted.

Therefore, in this example the total cord length when the boom is fully extended is equal to dimension $A$+dimension $B$+dimension $C$+dimension $D$ which equals 3000+500+3000+3000=9500 millimeters.

When the boom conveyor is fully retracted the total length of the cord is equal to:

dimension $A$+dimension $B$+dimension $C$+dimension $D$ which equals 3000+3000+3000+500=9500 millimeters.

During tilting operation of the boom conveyor the relevant dimensions may for example be as follows:

When the machine is in the raised position the dimension E between the anchor point of the cord 44 and the plane passing through the front pivot joint 40 is 110 millimeters. When the machine is in the lowered position the dimension E is 21 millimeters. The difference is therefore 89 millimeters. The level adjusting device 54 is positioned so that when the machine is in the raised position the dimension F between the level adjusting device 54 and a line that extends through the lower return pulley 50 is 5 millimeters. When the machine is in the lowered position the dimension F is 84 millimeters. These dimensions total 89 millimeters. Therefore, when the boom conveyor 4 tilts up or down the level adjusting device 54 takes up exactly the correct amount of cord to ensure that the base 36 of the operator platform 32 is maintained in a horizontal position.

Various modifications of the apparatus described above are of course possible. For example, if a fixed length boom is required the telescopic front and rear sections 8, 6 of the boom 4 can be omitted and replaced by a single non-adjustable boom. The first and second pulley wheels 46, 48 that provide compensation for changes in the length of the boom can also then be omitted and the elongate cord 44 can be attached at its rear end to a fixed anchor at the location of the fourth pulley wheel 52. The static pulley wheel 44 will then engage the portion of the cord between the third pulley wheel 50 and the cord anchor to provide compensation for the changing angle of the boom as it pivots about pivot joint 24.

Alternatively, the elongate cord 44 can be attached at its rear end directly to the bracket 56 after passing around the third pulley wheel 50 to provide compensation for the changing angle of the boom as it pivots about pivot joint 24. The fourth pulley wheel 52 and the static pulley wheel 44 can also then be omitted.

The invention claimed is:

1. A telescopic boom conveyor apparatus including a boom that carries a conveyor, a support structure for the boom, a rear pivot joint that connects a rear end of the boom to the support structure, a pivot drive that controls pivoting movement of the boom about the rear pivot joint, an operator cage attached by a front pivot joint to a front end of the boom, and a levelling system that controls rotation of the operator cage about the front pivot joint, wherein the levelling system includes a flexible cord that is attached to the operator cage and extends from the cage towards the rear end of the boom, and a level adjusting device including a pulley wheel that is attached to the support structure adjacent the rear end of the boom and engages an adjusting portion of the cord, whereby during pivoting movement of the boom the level adjusting device controls longitudinal movement of the cord relative to the boom so as to apply a levelling adjustment to the operator cage, wherein the boom conveyor includes a rear boom section that is connected by the rear pivot joint to the support structure, and a front boom section that is connected by the front pivot joint to the operator cage, wherein the front and rear boom sections are telescopically adjustable to adjust the length of the boom conveyor, wherein the levelling system includes a compensating mechanism including a first compensating guide element and a second compensating guide element that compensates for changes in the length of the boom conveyor, and wherein the first compensating guide element is located towards a rear end of the front boom section and the second compensating guide element is located towards a front end of the rear boom section, and wherein the cord includes a front portion that extends from the operator cage to the first compensating guide element, an intermediate portion that extends from the first compensating guide element to the second compensating guide element, a rear portion that extends from the second compensating guide element to a return mechanism located towards the rear end of the boom conveyor, and a return portion that extends forwards from the return mechanism and is attached to the front boom section.

2. A boom conveyor apparatus according to claim 1, wherein the levelling system includes a lower guide element attached to the boom adjacent the rear end thereof, and wherein the adjusting portion of the cord extends between the lower guide element and the level adjusting device, the level adjusting device and the lower guide element both being located below the rear pivot joint.

3. A boom conveyor apparatus according to claim 2, wherein the levelling system includes an upper guide element or anchor attached to the boom adjacent the rear end thereof, and wherein the adjusting portion of the cord extends between the lower guide element and the upper guide element or anchor, and the level adjusting device engages the adjusting portion of the cord between the lower guide element and the upper guide element or anchor.

4. A boom conveyor apparatus according to claim 3, wherein the lower guide element and/or the upper guide element comprises a pulley wheel.

5. A boom conveyor apparatus according to claim 3, wherein the levelling system is configured such that the cord is maintained in tension by the weight of the operator cage.

6. A boom conveyor apparatus according to claim 2, wherein the lower guide element and/or the upper guide element comprises a pulley wheel.

7. A boom conveyor apparatus according to claim 6, wherein the levelling system is configured such that the cord is maintained in tension by the weight of the operator cage.

8. A boom conveyor apparatus according to claim 2, wherein the levelling system is configured such that the cord is maintained in tension by the weight of the operator cage.

9. A boom conveyor apparatus according to claim 2, wherein the boom conveyor includes a rear boom section that is connected by the rear pivot joint to the support structure, and a front boom section that is connected by the front pivot joint to the operator cage, wherein the front and rear boom sections are telescopically adjustable to adjust the length of the boom conveyor.

10. A boom conveyor apparatus according to claim 1, wherein the levelling system is configured such that the cord is maintained in tension by the weight of the operator cage.

11. A boom conveyor apparatus according to claim 10, wherein the cord is attached to the operator cage above the front pivot joint.

12. A boom conveyor apparatus according to claim 1, wherein the boom conveyor is pivotable through an angle of at least 10°.

13. A boom conveyor apparatus according to claim 12, wherein the conveyor comprises a conveyor belt that runs over an upper surface of the boom, or a plurality of conveyor rollers on an upper surface of the boom.

14. A boom conveyor apparatus according to claim 1, wherein the boom conveyor is pivotable through an angle of at least 10°.

15. A boom conveyor apparatus according to claim 14, wherein the conveyor comprises a conveyor belt that runs over an upper surface of the boom, or a plurality of conveyor rollers on an upper surface of the boom.

16. A telescopic boom conveyor apparatus including a boom that carries a conveyor, a support structure for the boom, a rear pivot joint that connects a rear end of the boom to the support structure, a pivot drive that controls pivoting movement of the boom about the rear pivot joint, an operator cage attached by a front pivot joint to a front end of the boom, and a levelling system that controls rotation of the operator cage about the front pivot joint, wherein the levelling system includes a flexible cord that is attached to the operator cage and extends from the cage towards the rear end of the boom, and a level adjusting device including a pulley wheel that is attached to the support structure adjacent the rear end of the boom and engages an adjusting portion of the cord, whereby during pivoting movement of the boom the level adjusting device controls longitudinal movement of the cord relative to the boom so as to apply a levelling adjustment to the operator cage, wherein the levelling system includes a lower guide element attached to the boom adjacent the rear end thereof, and wherein the adjusting portion of the cord extends between the lower guide element and the level adjusting device, the level adjusting device and the lower guide element both being located below the rear pivot joint.

17. A boom conveyor apparatus according to claim 16, wherein the levelling system includes an upper guide element or anchor attached to the boom adjacent the rear end thereof, and wherein the adjusting portion of the cord extends between the lower guide element and the upper guide element or anchor, and the level adjusting device engages the adjusting portion of the cord between the lower guide element and the upper guide element or anchor.

18. A boom conveyor apparatus according to claim 16, wherein the lower guide element and/or the upper guide element comprises a pulley wheel.

19. A telescopic boom conveyor apparatus including a boom that carries a conveyor, a support structure for the boom, a rear pivot joint that connects a rear end of the boom to the support structure, a pivot drive that controls pivoting movement of the boom about the rear pivot joint, an operator cage attached by a front pivot joint to a front end of the boom, and a levelling system that controls rotation of the operator cage about the front pivot joint, wherein the levelling system includes a flexible cord that is attached to the operator cage and extends from the cage towards the rear end of the boom, and a level adjusting device including a pulley wheel that is attached to the support structure adjacent the rear end of the boom and engages an adjusting portion of the cord, whereby during pivoting movement of the boom the level adjusting device controls longitudinal movement of the cord relative to the boom so as to apply a levelling adjustment to the operator cage, wherein the levelling system is configured such that the cord is maintained in tension by the weight of the operator cage.

20. A boom conveyor apparatus according to claim 19, wherein the cord is attached to the operator cage above the front pivot joint.

* * * * *